UNITED STATES PATENT OFFICE.

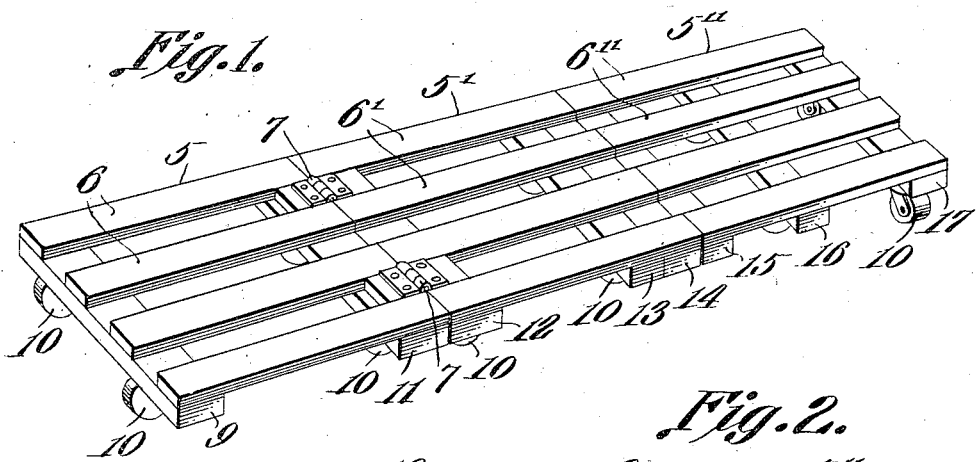
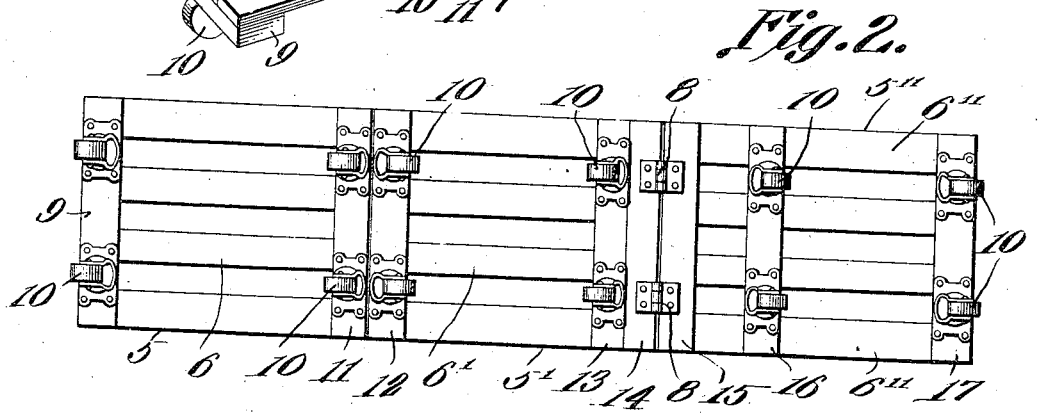
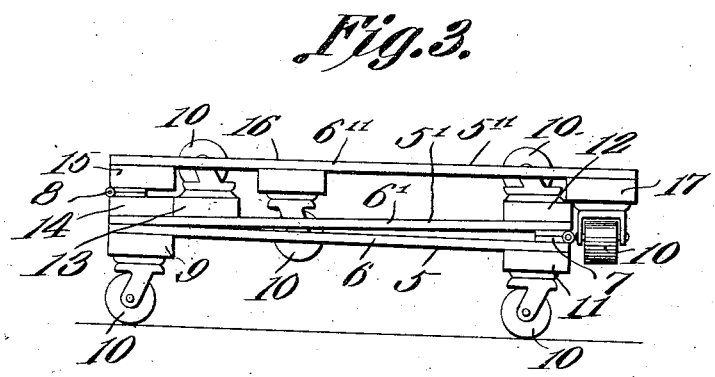

ARTHUR WILLIAM HOLLINGSHEAD, OF BLOOMSBURG, PENNSYLVANIA.

TRUCK FOR AUTOMOBILES.

1,098,262.  Specification of Letters Patent.  Patented May 26, 1914.

Application filed September 13, 1911. Serial No. 649,097.

*To all whom it may concern:*

Be it known that I, ARTHUR W. HOLLINGSHEAD, a citizen of the United States, residing at Bloomsburg, in the county of Columbia and State of Pennsylvania, have invented a new and useful Truck for Automobiles, of which the following is a specification.

This invention relates to trucks for use in connection with automobiles, and has for its object to provide a collapsible or foldable truck which, when not in use may be compactly folded together to be conveniently carried about.

This truck is especially adapted for use in making repairs, the truck being readily run under the body of the automobile whereby the mechanic or chauffeur may lie upon same in making repairs under the automobile.

To the above ends this invention is embodied essentially in a plurality of sections hinged together and foldable bottom to bottom and top to top one on the other, each of the sections being provided with a plurality of casters or supporting members for individually supporting the respective sections when the truck is in open position, and provision is made whereby the sections may be folded compactly together without the interference of the casters.

This invention is illustrated in the accompanying drawings, wherein similar reference characters indicate similar parts, and wherein,—

Figure 1 is a perspective view of the truck in open position. Fig. 2 is a bottom view thereof. Fig. 3 is an elevation of the truck in collapsed or folded position.

Referring specifically to the drawings, the truck comprises the three sections 5, 5′ and 5″. The end section 5 comprises the spaced longitudinal slats 6, and the transverse bars 9 and 11 secured to the ends of the said slats on their bottom faces. The intermediate or central section 5′ comprises the spaced longitudinal slats 6′ and the transverse bars 12 and 14 secured to the ends of the said slats on their bottom faces, and an intermediate supplemental transverse bar 13 is secured to the bottom of the said slats. The other end section 5″ comprises the spaced longitudinal slats 6″ and the transverse bars 15 and 17 secured to the ends of the said slats on their bottom faces and an intermediate supplemental transverse bar 16 is secured to the bottom of the said slats. The adjoining ends of the various slats 6, 6′ and 6″ are designed to abut against each other when the sections are unfolded or opened, so as to provide continuous slats throughout the length of the truck, which is desirable. To the bars 9, 11, 12, 13, 16 and 17 are secured a pair of casters or supporting members 10 on the bottom thereof. The sections 5 and 5′ are hinged together end to end to have their upper faces swing against each other, the hinges 7 connecting the adjacent bars 11 and 12 of the said sections on their upper faces. The sections 5′ and 5″ are hinged together end to end to have the bottoms thereof swing together, the hinges 8 connecting the adjacent end bars 14 and 15 of the said sections on their lower faces. The sections 5 and 5′ are approximately of equal length, while the section 5″ is slightly longer than the said sections.

When the sections are open, the truck is free to be moved about upon the casters, and each of the sections is independently supported by the casters on the bottom thereof, and in folding the sections together, the casters of the bars 13 and 12 of the central section 5′ are adapted to pass between the slats 6″ of the section 5″, and the casters of the bar 16 are adapted to pass between the slats 6 and 6′ of the other sections. The section 5″ being longer than the sections 5 and 5′ prevents the bars 12 and 17 from coinciding, the outer bar 17 swinging slightly beyond the bar 12 in order that its inner edge may rest or seat on the outer edge of the bar 12. The bars 13 and 16 are spaced at different distances from the adjacent ends of the sections 6′ and 6″ to prevent the said bars from coinciding and permitting the casters thereof to pass between the respective slats of the opposite sections.

This truck will be found useful in garages and while making repairs on the road to prevent the repair man or chauffeur from lying upon the floor or ground while making repairs beneath the machine. The truck in being collapsible or foldable into a compact position may be conveniently carried about in the automobile, and when the sections of the truck are folded together, the casters of the section 5 are disposed outwardly whereby the truck in its collapsed or folded position may be moved about upon the said casters.

What is claimed as new is:—

1. A truck of the character described comprising a plurality of longitudinal spaced slats divided transversely to provide three sections, transverse bars secured to the ends of the said sections on the bottom faces thereof, hinges secured to the upper faces of one pair of adjoining bars and to the lower faces of the other pair of adjoining bars, so that the respective end sections may fold against the top and bottom of the intermediate section, and supporting members carried by all of the said bars excepting the last mentioned pair and being arranged below the spaces between the slats.

2. A truck of the character described comprising a plurality of longitudinal spaced slats divided transversely to provide three sections, transverse bars secured to the ends of the said sections on the bottom faces thereof, hinges secured to the upper faces of one pair of adjoining bars and to the lower faces of the other pair of adjoining bars, so that the respective end sections may fold against the top and bottom of the intermediate section, intermediate transverse bars secured to the bottom faces of the intermediate and one end section, and supporting members carried by all of the said bars excepting the second mentioned pair and arranged below the spaces between the slats.

In testimony that I claim the foregoing as my own, I have hereto affixed my signature in the presence of two witnesses.

ARTHUR WILLIAM HOLLINGSHEAD.

Witnesses:
 JACOB H. MAUST,
 DAVID R. COFFMAN.